United States Patent [19]
Varin et al.

[11] Patent Number: 4,756,518
[45] Date of Patent: Jul. 12, 1988

[54] DEVICE FOR GRIPPING AN OPTICAL FIBER

[75] Inventors: Jacques Varin, Colombes; Hervé Le Pivert, Paris; Gérard Normand, Boussieres, all of France

[73] Assignee: Compagnie Lyonnaise de Transmissions Optiques, Clichy, France

[21] Appl. No.: 932,766

[22] Filed: Nov. 19, 1986

[30] Foreign Application Priority Data

Nov. 25, 1985 [FR] France ............... 85 17396

[51] Int. Cl.[4] .................................... B25B 1/00
[52] U.S. Cl. ........................ 269/157; 269/217; 269/902; 269/903
[58] Field of Search .......... 269/98, 157, 217, 234, 269/902, 903, 43; 350/96.21; 65/4.2, 4.21, 11.1

[56] References Cited

U.S. PATENT DOCUMENTS

| 1,350,097 | 8/1920 | Glover | 269/157 |
| 3,824,744 | 7/1974 | Petrant | 269/902 |
| 4,196,897 | 4/1980 | Gordon | 269/157 |
| 4,208,095 | 6/1980 | Malsot | 350/96.21 |
| 4,220,397 | 9/1980 | Benasutti | 350/96.21 |
| 4,274,707 | 6/1981 | Pacey et al. | 350/96.20 |
| 4,276,113 | 6/1981 | Carlsen et al. | 156/502 |
| 4,537,466 | 8/1985 | Moisson et al. | 350/96.21 |

Primary Examiner—Frederick R. Schmidt
Assistant Examiner—Judy J. Hartman
Attorney, Agent, or Firm—Sughrue, Mion, Zinn, Macpeak, & Seas

[57] ABSTRACT

In a fiber-gripping device has a gripper head provided with a V-groove for housing an optical fiber and an elastically deformable holding member which is brought to bear on the optical fiber. The gripper head and holding member are provided with V-section channels located respectively in oppositely-facing relation. A cylindrical rod forming a pivot-pin is placed between said oppositely-facing channels. The device is caused to open by a spring which tends to produce a movement of pivotal displacement of the holding member away from the gripper head. A locking lever is adapted to move into a first position in which the holding member is located at a sufficient distance from the gripper head to permit free passage of the optical fiber and a second position in which the holding member fixes the optical fiber within its V-groove and exerts a force which is controlled by its own elastic deformation.

9 Claims, 4 Drawing Sheets

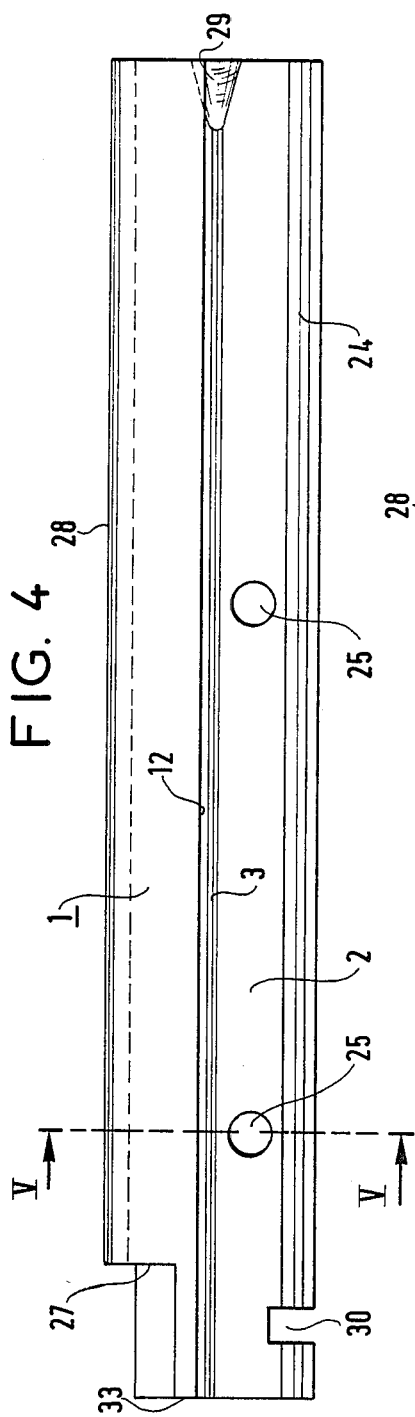
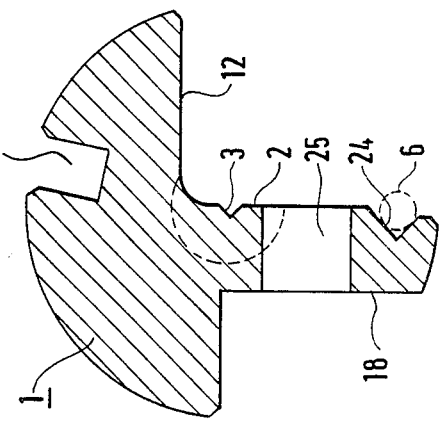
FIG. 4
FIG. 5

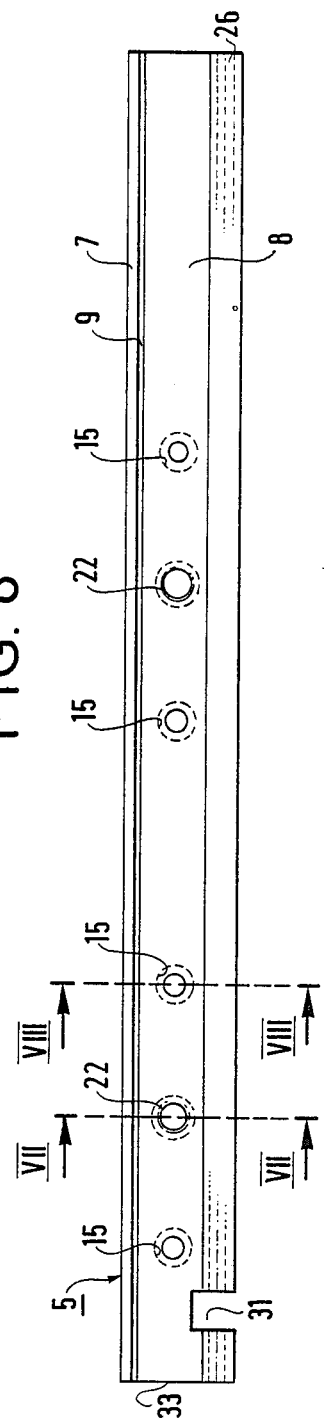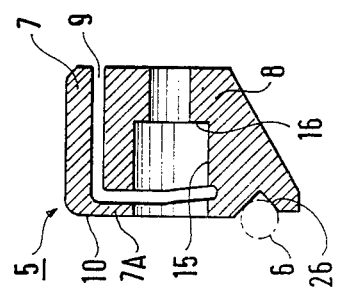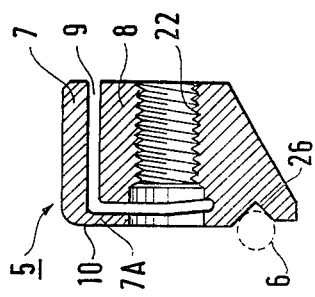

DEVICE FOR GRIPPING AN OPTICAL FIBER

BACKGROUND OF THE INVENTION

1. Field of the Invention

This invention relates to a device for gripping an optical fiber, including a gripper head provided with a rectilinear V-groove for housing an optical fiber which is in contact with the lips of said V-groove along two generator-lines, a fiber-holding member being brought to bear on the optical fiber along a generator-line opposite to the generator-line which is engaged to the greatest depth within the rectilinear V-groove of the gripper head, opening means and locking means.

2. Description of the Prior Art

U.S. Pat. No. 4,276,113 describes a gripper for maintaining two optical fibers in butt-aligned relation for fusion splicing. The gripper is formed by a head and a fiber-holding member which are both grooved, the holding member being capable of moving in rotation about an axis which is common with the head. The gripper is also provided with opening means and locking means such as a spring, for example. A device of this type is very cumbersome and does not readily permit transfer of an optical fiber from one work station to another. A further drawback is that no means are provided in this device for regulating and controlling the force applied transversely to the fiber.

The object of the present invention is to provide an optical-fiber gripping device which is of very small size, which permits easy transfer of the fiber from one work station to another (e.g. for operations such as stripping, cutting, fusing or bonding, reforming of coatings, tensile tests) and in which the holding force applied to the fiber can readily be controlled and reproduced. A further aim of the invention is to provide a high-precision fiber-gripping device which ensures reproducibility of positioning of the optical fiber at each work station without entailing any need for meticulous adjustments.

SUMMARY OF THE INVENTION

The fiber-gripping device in accordance with the invention is distinguished by the fact that the main body or so-called gripper head has a flat surface in which is cut a rectilinear groove having a V-shaped cross-section or so-called V-groove in which the optical fiber can be laid. The depth of said V-groove is such that part of the right section of the optical fiber is located above the V-groove when held in position. The gripper head is also provided with a V-section channel which is parallel to the V-groove, said V-section channel being in contact with a cylindrical rod which defines an axis of rotation along two of its generator-lines. In accordance with another distinctive feature, the fiber-holding member has a flat surface located opposite to the flat surface of the gripper head and cut so as to form a V-section channel which is located in oppositely-facing relation to the rectilinear V-section channel of the gripper head and supported on said cylindrical rod having two generator-lines which define the axis of rotation aforesaid. The contact between said V-section channel and said cylindrical rod defines an axis of rotation which accordingly permits a pivotal movement of the holding member with respect to the head. Said flat surface of the holding member extends from its V-section channel at least to a point beyond the V-groove of the gripper head and is capable of elastic deformation when said flat surface of the holding member is brought to bear on a generator-line of said optical fiber which has been laid within said rectilinear V-groove. The opening means aforesaid include at least one spring which tends to move the flat surface of the holding member away from the flat surface of the gripper head by causing pivotal displacement of one surface with respect to the other about said axis of rotation. The locking means aforesaid include at least one lever which is capable of occupying at least a first position in which the flat surface of the holding member is located at a sufficient distance from the flat surface of the gripper head to permit free passage of said optical fiber, and a second position in which the flat surface of the holding member applies on a generator-line of said optical fiber a force which tends to press said fiber within said V-groove, said force being controlled by the elastic deformation of said flat surface of the holding member.

The fiber-gripping device preferably has at least one of the following characteristic features:

the gripper head is of high-hardness material such as to have a Vickers hardness number higher than 100, and the fiber-holding member is of material having a Young's modulus higher than 10,000 daN/mm$^2$;

the fiber-holding member is provided with a longitudinal gap which extends transversely over only part of the right section of the holding member so that the aforesaid flat surface of said holding member which extends at least to a point beyond said V-groove of the gripper head is capable of undergoing elastic deformation when said flat surface of the holding member is brought to bear on a generator-line of the optical fiber which has been laid within said V-groove of the gripper head.

BRIEF DESCRIPTION OF THE DRAWINGS

FIG. 4 is a front view in elevation showing the flat surface of the support member and the V-groove formed in said surface.

FIG. 5 is a sectional view of the support member, this view being taken along line V—V of FIG. 4.

FIG. 6 is a view in elevation showing the fiber-holding member and looking on the holding-member face which is remote from the support member.

FIG. 7 is a sectional view of the fiber-holding member, this view being taken along the line VII—VII of FIG. 6.

FIG. 8 is a sectional view of the fiber-holding member, this view being taken along line VIII—VIII of FIG. 6.

DESCRIPTION OF THE PREFERRED EMBODIMENT

Figure 1:
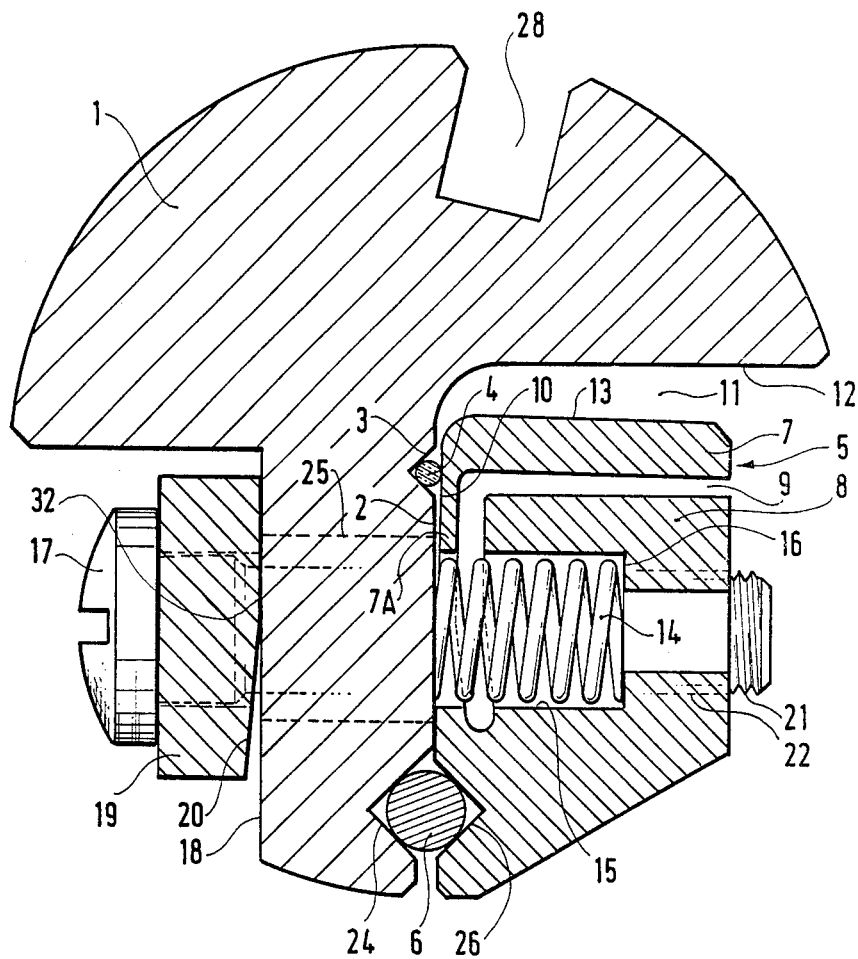
FIG. 1 illustrates the device in a part-sectional view taken at right angles to its longitudinal axis in the optical fiber holding position.

In FIG. 1, the fiber-gripping device includes a gripper head 1 of substantial length extending at right angles to the plane of the figure, the lower portion of said gripper head being delimited by two parallel flat surfaces 2 and 18. The flat face 2 is provided with a V-groove 3 for receiving the optical fiber 4. The fiber-holding member 5 is mounted on the head 1 for pivotal displacement about the rod 6 which is engaged within the oppositely-facing V-section channels 24 and 26 formed respectively in the gripper head and in the fiber-holding member. Said holding member is constituted by two portions 7, 7A located nearest the gripper head 1 and by a third portion 8 which is farthest away from said head and separated from the first two portions by a gap 9 so as to permit elastic deformation of the portion 7 of the fiber-holding member which contains the surface 10.

A helical spring 14 which works in compression is mounted within a bore 15 of the fiber-holding member so as to be tightly fitted between the annular shoulder 16 of the fiber-holding member and the flat face 2 of the head 1, thus tending to move the holding member away from the head 1 by rotation about the rod 6. As will become apparent from FIG. 6, four springs of this type are provided within bores of the fiber-holding member which are located at intervals along the length of said holding member.

Furthermore, a screw 21 located outside the section plane of FIG. 1 (but visible in FIGS. 2 and 3) and provided with a screw-head 17 extends through a bore 25 pierced in the gripper head 1 between the surface 2 and the surface 18 and is engaged in a corresponding internally-threaded bore 22 of the fiber-holding member. The diameter of the bore 25 is larger than the diameter of the screw 21. Between the screw-head 17 and the opposite flat surface 18 of the gripper head is disposed the lever 19 which is secured to the screw 21 and has the function of locking the device in the open position and in the closed position. The aforesaid lever, which is shown in the drawings in cross-section at right angles to its generator-lines, has the shape of a cylinder and has two surfaces 20 and 32 located opposite to the flat surface 18 of the gripper head. It will be seen hereinafter with reference to FIGS. 4 and 6 that provision is made for two screws and two levers which produce action in parallel.

Figure 2:
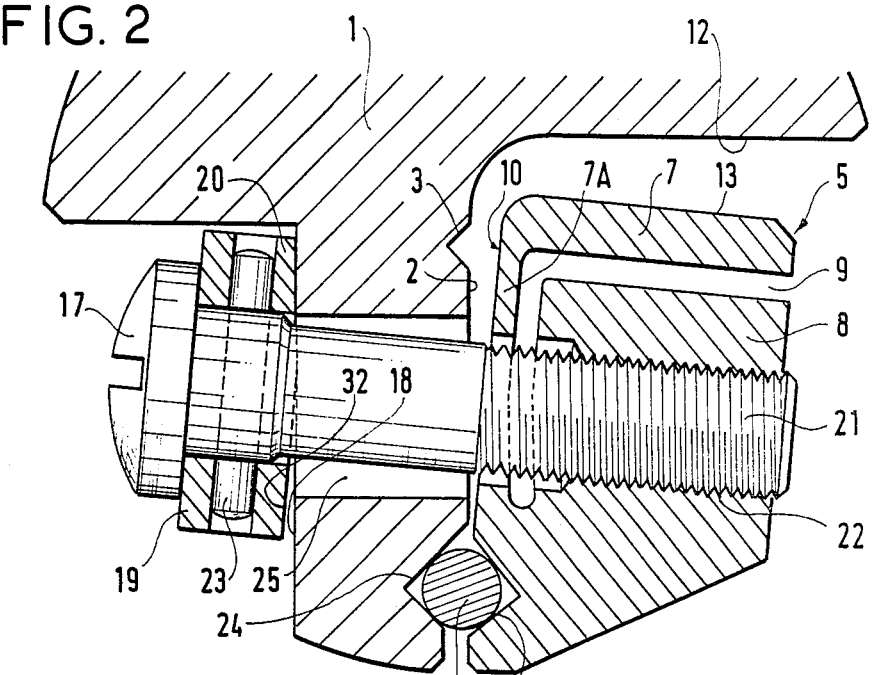
FIG. 2 illustrates the lower portion of the device in the open position.
Figure 3:
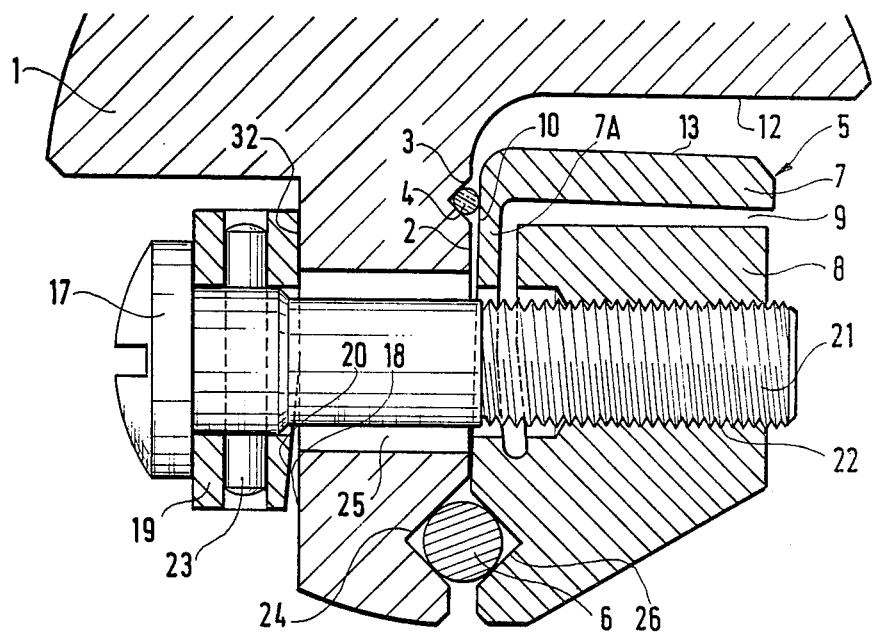
FIG. 3 illustrates the same lower portion of the device in the fiber-holding position.

FIGS. 2 and 3 are part-sectional views taken at right angles to the longitudinal axis of the device and showing the open and closed positions obtained by operation of the levers 19.

At one end of said levers are pierced two perpendicular bores, one for insertion of the screw 21, the other for insertion of the locking-pin 23 which keys the lever 19 rotationally with respect to the screw 21. The surface 32 is perpendicular to the axis of the screw 21. The surface 20 is slightly inclined with respect to the surface 32. The acute angle formed by these two surfaces determines the angle swept by the holding member 5 between its two open and closed end positions.

In the open position shown in FIG. 2, the surface 20 of the lever bears on the surface 18 of the gripper head. The screw 21 is not perpendicular to the flat surface 2 of said gripper head. The springs 14 (not shown in FIG. 2) maintain the holding member and the head at a distance from each other. The space between the face 12 of the head and the face 13 of the holding member and the space between the face 2 of the head in the vicinity of the V-groove 3 and the face 10 of the holding member are sufficient to ensure that the optical fiber 4 can be introduced into or withdrawn from the V-groove 3 and remains extended in a direction approximately parallel to the axis of the device. It is also possible to slide the fiber along the V-groove 3, in particular with a view to introducing the fiber at one end of the device. In order to facilitate this operation, the V-groove 3 is flared-out in the shape of a cone 29 as shown in FIG. 4 in that face of the device which is opposite to the front face 33.

In the closed position illustrated in FIG. 3, the lever has been operated in a movement of rotational displacement by one-half of a revolution about the axis of the screw 21. The surface 32 located at right angles to said axis is now in contact with the flat surface 18. Rotational displacement of the lever 19 has caused rotation of the screw 21 and the free length of this latter above the internally-threaded bore 22 has been reduced by a length equal to a one-half thread pitch, thus producing a movement of pivotal displacement of the holding member 5 about the rod 6 and towards the head 1. During this movement, the surface 10 of the holding member has been brought to bear on a generator-line of the fiber 4, thus maintaining the fiber applied within the V-groove 3 and producing elastic deformation of the portion 7A of the holding member which contains the surface 10. The force exerted on the fiber is adjusted by modifying the depth of engagement of the screw 21 within the internally-threaded bore 22. This adjustment is carried out at the time of assembly of the device and serves to position the screw 21 within the bore for insertion of the locking-pin 23.

FIG. 4 is a view in elevation which illustrates the gripper head. There can be seen in this figure the flat face 12, the V-groove 3 for housing the optical fiber, the V-section channel 24 corresponding to the axis of rotation of the holding member with respect to the head, and the bores 25 for insertion of the screws 21. In the left-hand portion of the head, a shouldered portion 27 having a surface which is machined with high precision serves to form a dimensional reference mark with respect to the front face 33 of the device for positioning said device and the end of the fiber within each work station. The gripper head is preferably of tungsten carbide or of like material having a high hardness number and affording resistance to the chemical products employed in the treatment operations to which the optical fiber is subjected.

FIG. 5 is a sectional view of the gripper head, this view being taken along the line V—V of FIG. 4 and in the plane of symmetry of a bore 25 for insertion of an adjusting screw 21.

The fiber-holding member is shown in elevation in FIG. 6 whilst FIGS. 7 and 8 are sectional views taken along the lines VII—VII and VIII—VIII of FIG. 6 which pass respectively through the axis of a screw and through the axis of a bore for housing a spring. Said holding member is provided with the gap 9 whose function is to permit elastic deformation of the portion 7A of the holding member which contains the surface 10, with four bores 15 for housing springs, and with two internally-threaded bores 22 for receiving the screws 21.

In FIG. 4 which illustrates the head and in FIG. 6 which illustrates the holding member, the grooves 30 and 31 located at right angles to the axis of the device are intended to receive a washer of substantial thickness in which the cylindrical rod 6 is forcibly engaged. The result thereby achieved is to prevent any displacements of the holding member with respect to the head along the axis of the device. In FIGS. 1, 4 and 5 which illustrate the gripper head, there can be seen a rectangular-section groove 28 in which is slidably mounted a centering stud or guide which is rigidly fixed to each work station. This makes it possible to fix the orientation of the device about its longitudinal axis and therefore of the fiber which is held in position within the device.

The fiber-holding member is preferably of resilient material which affords resistance to the chemicals employed in fiber treatment processes. Suitable materials include the stainless steel designated as AP4H15 and marketed by the company known as Comptoir Lyon-Alemand under the trade name "ARCAP".

Although it appears preferable to form the gripper head of material having high hardness and to form the fiber-holding member of material which is capable of undergoing elastic deformations, they may also be formed of the same material which has medium characteristics of hardness and elasticity such as, for example, a synthetic resin which offers the advantage of lower cost. In this case, it is preferable to ensure that this material has a Vickers hardness number higher than 30 and a Young's modulus higher than 1000 daN/mm².

The fiber-gripping device described in the foregoing with reference to the accompanying figures permits position-maintenance of an optical fiber having a diameter which can vary to a certain extent (for example between 200 and 230 microns) by exerting thereon a calibrated holding force of small magnitude. The gripper assembly is of small overall size. By way of example, the entire assembly is contained within a cylinder having a diameter of the order of 5 mm and a length of the order of 50 mm. When the fiber has been introduced and held firmly in position, the device can be transferred from one work station to another, for example to successive stations for stripping the fiber, cutting, fusing, coating and tensile testing. The device can be maintained in position in these different stations with a high holding force without damaging the fiber and with a high degree of accuracy by reason of the dimensional reference mark provided on the head.

The number of screws 21, the number of springs 14, and similarly the helical shape of these springs, correspond to a preferred embodiment of the invention as illustrated in the figures. It would clearly be possible, however, to change the number and shapes of the springs and to make use of springs designed, for example, in the shape of a hairpin applied against the surfaces 2 and 10 without thereby departing from the scope of the invention.

Similarly, the accompanying drawings show that the device hereinbefore described is entirely contained within a cylinder having a right section in the shape of a circle to which it is tangent over a large part of its surface. This arrangement makes it possible in particular to maintain the device within a split sleeve clamping system or within a chuck having three jaws located at 120°. As will readily be apparent, however, it would be possible to adopt other cross-sections of said cylinder which may be better suited for a particular fiber-holding system. For example, a trapezoidal cross-section could prove advantageous for holding a fiber between two parallel flat jaws.

What is claimed is:

1. In a device for gripping an optical fiber, including a gripper head provided with a rectilinear V-groove for housing an optical fiber in contact with the lips of said V-groove along two generator-lines, a fiber-holding member for bearing on the optical fiber along a generator-line opposite to a generator-line which is engaged to the greatest depth within the rectilinear V-groove of the gripper head and device opening means and locking means, the improvement wherein:

said gripper head has a first flat surface and said rectilinear V-groove for holding an optical fiber to be laid is within said first flat surface;
   the depth of the rectilinear V-groove is such that part of the right section of the optical fiber projects outwardly of the V-groove when held in position;
   the flat surface of the gripper head further includes a rectilinear V-section channel parallel to the V-groove, and a cylindrical rod is positioned in said V-section channel, which rod defines an axis of rotation along two of its generator-lines;
   said fiber-holding member has a flat surface located opposite to the first flat surface of the gripper head and includes a V-section channel therein which is located in oppositely-facing relation to the rectilinear V-section channel of the gripper head and is supported on said cylindrical rod having two generator-lines which define said axis of rotation, the contact between said V-section channel and said cylindrical rod being such as to define an axis of rotation which accordingly permits a pivotal movement of the holding member with respect to the head, said flat surface of the holding member extending from its V-section channel at least to a point beyond the V-groove of the gripper head and being capable of elastic deformation when said flat surface of the holding member is brought to bear on a generator-line of said optical fiber which has been laid within said rectilinear V-groove;
   said opening means includes at least one spring which tends to move the flat surface of the holding member away from the first flat surface of the gripper head by causing pivotal displacement of one surface with respect to the other about said rod axis of rotation;
   said locking means includes at least one lever for occupying at least a first position in which the flat surface of the holding member is located at a sufficient distance from the first flat surface of the gripper head to permit free passage of said optical fiber, and a second position in which the flat surface of the holding member applies on a generator-line of said optical fiber a force which tends to press said fiber within said V-groove wherein said force is controlled by the elastic deformation of said flat surface of the holding member, and
   wherein said fiber holding member is slotted forming a longitudinal gap which extends transversely over only part of the right section of the holding member and at least partially parallel to the flat surface of the holding member and proximate to said flat surface so that the flat surface of the holding member which extends from its V-section channel in the direction of the V-groove of the gripper head is capable fo undergoing elastic deformation when said flat surface of the holding member is brought to bear on the generator-line of the optical fiber which has been laid within said V-groove of the gripper head.

2. A device according to claim 1, wherein the gripper head is of high-hardness material having a Vickers hardness number higher than 100 and wherein the fiber-holding member is of material having a Young's modulus higher than 10,000 daN/mm².

3. A device according to claim 1, wherein the gripper head and the fiber-holding member are of the same material having a Vickers hardness number higher than 30 and a Young's modulus higher than 1000 daN/mm².

4. A device according to claim 1, wherein said longitudinal gap extends at least partially from the V-section channel of the holding member to a point proximate the V-groove of the gripper head.

5. A device according to claim 1, wherein the fiber-holding member has a Young's modulus higher than 1000 daN/mm$^2$.

6. The device according to claim 5, wherein the fiber-holding member has a Vickers hardness number higher than 30.

7. The device according to claim 1, wherein said gap is of L-shaped configuration including a second portion at right angles to a first portion extending parallel to the flat surface of the holding member and said second portion extends through said holding member in a direction away from said flat surface.

8. The device according to claim 1, wherein said gripper head includes a second flat surface parallel to said flat surface of said gripper head bearing said V-groove for holding said optical fiber, a bore extending through said gripper head and opening to opposite first and second flat surfaces and between the V-section channel of the gripper head and the rectilinear V-groove of said gripper head, said fiber-holding member having a tapped hole therein passing transversely therethrough from said fiber-holding member flat surface and being counterbored within the portion thereof defined by said flat surface of said fiber-holding member and the portion of the longitudinal gap which extends generally parallel thereto, wherein said lever comprises an axial bore, a headed screw projects through the bore of said lever, through the bore of said gripper head, and terminates in a threaded end threaded to the tapped bore of said fiber-holding member, and wherein the diameter of the screw at said gripper head bore and the counterbore of said fiber-holding member is of a diameter less than the gripper head bore and the fiber-holding member counterbore, respectively and wherein said lever includes a flat surface perpendicular to the bore passing therethrough on a face thereof contacting said second flat surface of said gripper head and an oblique surface portion extending from said lever flat surface such that the lever can rock on the second flat surface of said gripper head, and wherein said screw includes a transverse bore and said lever includes a corresponding transverse bore alignable therewith, and a locking pin insertably mounted within the aligned transverse bores of said screw and said lever, whereby rotational displacement of the lever about the axis of the bore passing through the lever, results in rocking of the lever on the second flat surface of the gripper head, with corresponding rotation of the screw to reduce the free length of the screw relative to the tapped bore of the fiber-holding member to effect pivotable displacement of the holding member about the rod producing elastic deformation of the portion of the holding member defined by the gap to cause the holding member to bear on a generator line of the optical fiber within the gripper head V-groove.

9. The device as claimed in claim 8, wherein the fiber-holding member includes a cylindrical recess within the flat surface thereof over a portion of the transverse depth of the holding member, and wherein a compression coil spring is positioned within said recess and bears, at one end, on a shoulder of the fiber-holding member defined by the recess and an opposite end of said compression coil spring bears on the first flat surface of the gripper head for biasing the fiber-holding member away from the gripper head flat surface and in V-groove open position.

* * * * *